US009477212B2

(12) United States Patent
Le et al.

(10) Patent No.: US 9,477,212 B2
(45) Date of Patent: Oct. 25, 2016

(54) SAFETY SWITCHING DEVICE FOR THE FAILSAFE SHUTDOWN OF AN ELECTRICAL LOAD

(71) Applicant: Pilz GmbH & Co. KG, Ostfildern (DE)

(72) Inventors: Kim Le, Ostfildern (DE); Sebastian Richter, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 595 days.

(21) Appl. No.: 13/910,189

(22) Filed: Jun. 5, 2013

(65) Prior Publication Data

US 2013/0264890 A1    Oct. 10, 2013

Related U.S. Application Data

(63) Continuation of application No. PCT/EP2011/071688, filed on Dec. 5, 2011.

(30) Foreign Application Priority Data

Dec. 6, 2010 (DE) .................. 10 2010 054 386

(51) Int. Cl.
G05B 9/02 (2006.01)
(52) U.S. Cl.
CPC .............. G05B 9/02 (2013.01); Y10T 307/977 (2015.04)
(58) Field of Classification Search
None
See application file for complete search history.

(56) References Cited

U.S. PATENT DOCUMENTS

| 7,593,205 | B2 | 9/2009 | Veil |
| 8,692,420 | B2 | 4/2014 | Frevert |
| 2002/0180278 | A1 | 12/2002 | Veil et al. |
| 2003/0011250 | A1 | 1/2003 | Pullmann et al. |
| 2003/0212849 | A1 | 11/2003 | Dold et al. |
| 2007/0091518 | A1* | 4/2007 | Pullmann ............. H01H 47/002 361/23 |

FOREIGN PATENT DOCUMENTS

| CN | 1133966 | 10/1996 |
| CN | 101689042 | 3/2010 |
| DE | 199 62 497 A1 | 7/2001 |

(Continued)

OTHER PUBLICATIONS

Chinese Search Report dated Feb. 15, 2015; 2 pp.
ISA/EP; English language translation of International Preliminary Report on Patentability (Chapter 1); issued by WIPO Jun. 12, 2013; 8 pp.

(Continued)

*Primary Examiner* — Jared Fureman
*Assistant Examiner* — Aqeel Bukhari
(74) *Attorney, Agent, or Firm* — Harness, Dickey & Pierce, P.L.C.

(57) ABSTRACT

A safety switching device for the failsafe shutdown of an electrical load has at least one input circuit for receiving an input signal from a signaling device which signals a safety-related state, an evaluation and control unit for evaluating the input signal, and at least one output circuit for outputting an output signal. The safety switching device further has at least one switching element for interrupting a current supply path to the load in dependence on the input signal. The input circuit and the output circuit are joined at a device connector so that the device connector can selectively be used as an input for receiving the input signal or as an output for outputting the output signal. The input circuit has a test switch which is coupled to the evaluation and control unit which is designed for selectively suppressing the input signal using the test switch.

20 Claims, 2 Drawing Sheets

(56) References Cited

FOREIGN PATENT DOCUMENTS

| DE | 100 11 211 A1 | 9/2001 |
| DE | 102 11 099 A1 | 10/2003 |
| DE | 10 2004 020 995 A1 | 11/2005 |
| EP | 1 347 388 A1 | 9/2003 |
| JP | 2003-303037 | 10/2003 |

OTHER PUBLICATIONS

EN 954-1; Safety-related parts of control systems Part 1: General principles for design; Mar. 1997; 34 pp.

EN ISO 13849-1; Safety of machinery—Safety-related parts of control systems—Part 1: General principles for design; 2006; 97 pp.

* cited by examiner

SAFETY SWITCHING DEVICE FOR THE FAILSAFE SHUTDOWN OF AN ELECTRICAL LOAD

CROSS-REFERENCES TO RELATED APPLICATIONS

This application is a continuation of international patent application PCT/EP2011/071688 filed on Dec. 5, 2011 designating the U.S., which international patent application has been published in German language and claims priority from German patent application DE 10 2010 054 386.1 filed on Dec. 6, 2010. The entire contents of these priority applications are incorporated herein by reference.

BACKGROUND OF THE INVENTION

The present invention relates to a safety switching device for the failsafe shutdown of an electrical load, and, in particular, for the failsafe shutdown of a machine or a machine installation which poses a hazard to people.

Safety switching devices usually have a number of terminals or device connectors to which so-called signaling devices, on the one hand, and actuators on the other hand are connected. Typical signaling devices for safety switching devices are emergency-off push buttons, guard-door switches, two-hand operated switches, light barriers and various sensors which provide safety-related signals with respect to a monitored machine or machine installation. The safety switching device monitors the safety-related signals from the signaling devices, evaluates them and generates in dependence thereon control signals for actuators which are designed for shutting down the hazardous machine or machine installation in a failsafe manner. In addition, the safety switching devices often generate output signals by means of which the operating state of a simple mechanical signaling device such as, for instance, an emergency-off push button is monitored. For example, an output signal generated by the safety switching device might be fed back in a loop via electrical contacts of an emergency-off push button to an input of the safety switching device, and the safety switching device shuts down the machine or machine installation if the fed back output signal is not detected. In contrast, light barriers or intelligent sensors usually generate their own output signals which can be received at an input of the safety switching device and evaluated. In such a case, the safety switching device does not need to provide an output signal for monitoring the light barrier even though this is still possible for certain light barriers, for instance for diagnostic purposes.

Depending on the number and type of safety functions which have to be monitored at a machine or machine installation, a suitable safety switching device needs a certain number of inputs and outputs for connecting signaling devices and actuators. The number of inputs and outputs increases when a high safety category is required for safeguarding a hazardous machine or machine installation. In such cases, the signaling device, the safety switching device and the actuators are typically connected via redundant lines so that the number of required inputs and outputs is typically doubled.

On the other hand, there is a desire to make a safety switching device as compact and small as possible since the installation space in a switchgear cabinet or the like is often limited. There are devices, therefore, in which terminals for connecting signaling devices and actuators can be configured so that the function of the terminal can be different depending on the respective application. For example, the assignee has sold decentralized I/O assemblies called PSS SB DI16 for a decentralized safety control system in which different types of output signals could be provided at certain connecting terminals. In particular, steady-state output signals or clocked output signals having different clock periods could selectively be provided at certain output terminals. Accordingly, it was possible to reduce the number of connecting terminals and thus also the housing size of the devices. However, the configurable connecting terminals were not available for all safety functions, especially not for a change from an input function to an output function.

EP 1 347 388 B1 discloses a bus coupler for connecting signaling devices and actuators to a field bus system. To allow a flexible connection of safety sensors and standard sensors, EP 1 347 388 B1 proposes that different functional characteristics from a set of predefined functional characteristics can be applied to individual connecting pins of the plugs. In one exemplary embodiment, the plug has five contact elements, at least some of which can be selectively used as input or as ground terminal. However, circuit details which allow such a variable use of a contact element are not described in this document.

DE 199 62 497 A1 discloses a safety switching device having an input circuit for receiving an input signal from a signaling device which signals a safety-related state, having an output circuit for outputting an output signal and having switching elements which are designed for interrupting a current supply path to an electrical load. An evaluation and control unit actuates the switching elements in dependence on the input signal. The input circuit comprises an optocoupler which combines a clock signal generated by the safety switching device with the input signal from the signaling device. The periodic clock signal controls a light-emitting diode of the optocoupler whilst the signal from the signaling device is conducted via the collector-emitter path of a light-sensitive transistor. Combining the input signal from the signaling device with the clock signal from the safety switching device results in the signal from the signaling device being modulated with the clock signal. As a consequence, the combined signal has periodic signal changes which allow the safety switching device internal functional testing of its signal paths even if the signal from the signaling device remains static in one signal state over relatively long periods.

DE 102 11 099 A1 discloses a device for actuating an electrical load, wherein a control transistor is connected via a line to a port of a control and evaluation unit. An output of the control transistor is connected to the control input of a driver transistor. At the output of the driver transistor, the electrical load is arranged. In addition, a voltage feedback unit is provided which couples the electrical voltage at the output of the driver transistor back to the line between the port of the control and evaluation unit and the control transistor. The port of the control and evaluation unit can be configured as output for outputting the control signal or as input for sensing a signal present on the line.

SUMMARY OF THE INVENTION

Against this background, it is an object of the present invention to provide a safety switching device which can be flexibly used for different functions including different safety functions.

According to one aspect of the invention, there is provided a safety switching device for an installation comprising a hazardous machine and at least one signaling device for signaling a safety-related state of said machine, the safety switching device comprising a number of connecting terminals, at least one input circuit for receiving an input signal from the signaling device, at least one output circuit for outputting an output signal, at least one switching element designed for interrupting a current supply path to the machine, and an evaluation and control unit designed for actuating the at least one switching element in dependence on the input signal, with the at least one input circuit and the at least one output circuit being joined at one from the number of connecting terminals so that said one connecting terminal can selectively be used either as an input terminal for receiving the input signal or as an output terminal for outputting the output signal, with the input circuit comprising a test switch coupled to the evaluation and control unit, and with the evaluation and control unit being designed for selectively suppressing the input signal using the test switch.

According to another aspect, there is provided a safety switching device for the failsafe shutdown of an electrical load, comprising a number of device connectors, comprising at least one input circuit for receiving an input signal from a signaling device signaling a safety-related state, comprising at least one output circuit for outputting an output signal, comprising at least one switching element for interrupting a current supply path to the load, and comprising an evaluation and control unit designed for actuating the at least one switching element in dependence on the input signal, with the at least one input circuit and the at least one output circuit being joined at one from the number of device connectors so that said one device connector can selectively be used as input for receiving the input signal or as output for outputting the output signal, with the input circuit having a test switch coupled to the evaluation and control unit, and with the evaluation and control unit being designed for selectively suppressing the input signal using the test switch.

In some preferred exemplary embodiments, the novel safety switching device is a configurable mini controller which allows the evaluation and monitoring of the connected signaling devices and the actuation of the actuators for shutting down a machine or machine installation as a stand-alone device. In this case, only the signaling devices and actuators need to be connected to the novel safety switching device, and the safety switching device has to be configured and/or programmed in accordance with the desired safety functions.

In other exemplary embodiments, the novel safety switching device can be a part of a larger decentralized control system. For example, the safety switching device can be a decentralized I/O unit which is connected to a central controller via a field bus. In yet another exemplary embodiment, the safety switching device can be a module assembly for a programmable controller, such as a programmable controller as is sold by the assignee of the present invention under the trademark PSS®.

In any case, the safety switching device according to the preferred embodiments meets at least the requirements of category 3 or higher in terms of European Standard EN 954-1, SIL2 or higher according to EC61508 or Performance Level d or higher according to ISO 13849-1. In particular, a fault in the safety chain from the signaling device to the safety switching device and further to the actuator, such as failure of a component or damage to a cable, must not lead to the loss of the safety function which is guaranteed by an appropriate design of the safety switching device.

The new safety switching device has at least one device connector or terminal which can selectively be used as input for a safe input function or as output. The output might also implement a safety function—if necessary in combination with a further output at another device connector or terminal. By means of the test switch in the input circuit, the evaluation and control unit can check the plausibility of an input signal at the configurable device connector. In particular, the evaluation and control unit can test, by means of the test switch, whether a signal change from a static high level at the input to a low level can be detected. This is of significance for implementing a safe input function with static signals since the low level at a safe input typically represents a safety request (principle of zero-signal current).

The evaluation and control unit cannot necessarily determine, using a simple test switch, whether a fault has occurred in the external connections of the safety switching device and especially in the connecting lines to the configurable device connector. This could be problematic with a single-channel input and a steady-state input signal. In order to achieve a high safety category, two or more inputs having redundant circuitry are therefore typically used, which is enabled by the novel safety switching device in preferred exemplary embodiments by providing several configurable device connectors. By means of the test switch, however, the evaluation and control unit can test the device-internal function of the input circuit and thus detect any potential failure of components which would prevent the detection of a low level. In principle, the novel safety switching device thus allows the implementation of a safety function at the configurable connecting terminal.

On the other hand, the device connector can alternatively be used as an output. In some exemplary embodiments, the test switch can be used for decoupling the input circuit from the output signal. In other exemplary embodiments, the evaluation and control unit can read the output signal device-internally back at the same device connector via the input circuit, which facilitates the implementation of a safe output function.

In all cases, it is preferred if the evaluation and control unit shuts down the electrical machine or load by means of the at least one switching element when the test of the input signal leads to an unexpected result and especially when a low level selectively caused by means of the test switch (input signal suppressed) does not reach the evaluation and control unit.

In a preferred refinement, the at least one input circuit and the at least one output circuit are joined at a node which is located between the device connector or terminal and the test switch.

In this refinement, the output signal reaches the configurable device connector without being conducted to the device connector via the test switch. The test switch therefore cannot corrupt the output signal at the configurable device connector. The output is thus implemented as a "normal" output which provides for simpler integration into proven circuit concepts for safety switching devices.

In a further refinement, the safety switching device has a signal path which is connected to the output circuit and which by-passes the test switch.

In this refinement, a signal path is arranged in parallel with the test switch via which an output signal of the output circuit is coupled into the input circuit, bypassing the test switch. This refinement enables the output signal to be read back twice to the evaluation and control unit, namely, on the one hand, via the signal path which acts like a bypass for the test switch and, on the other hand, via the test switch itself. The refinement has the advantage that the evaluation and control unit can detect any unwanted influence on an input signal at the connecting terminal by the output circuit. In particular, the evaluation and control unit can detect, due to the signal path, whether the output circuit permanently pulls up an input signal at the device connector to a high level, when the node at which the input circuit and the output circuit are joined is located between the device connector and the test switch. The refinement is therefore very advantageous for achieving a high failsafety in a simple manner.

In a further refinement, the safety switching device has directional coupler, such as a diode, a transistor, an optocoupler or a similar component, which is arranged between the signal path and the device connector in order to decouple the signal path from the connecting terminal.

In this context, the directional coupler is a component which allows a current flow substantially only in one direction but not in the opposite direction. The refinement is a very simple approach for preventing that the input signal passes via the signal path to the evaluation and control unit and can thus bypass the test switch. In combination with the aforementioned refinement, this refinement allows for a failsafe detection of low levels at the configurable device connector. The combination of these two refinements is thus particularly advantageous in order to achieve a high safety category at the configurable device connector in an inexpensive manner.

In a further refinement, the safety switching device has a plurality of input circuits and a plurality of output circuits which are respectively joined in pairs at a plurality of device connectors.

In this refinement, the safety switching device has a number of configurable device connectors of the type previously described. Advantageously, each of these configurable device connectors is implemented in a failsafe manner in accordance with the two aforementioned refinements. Providing a number of such configurable device connectors enables a particularly flexible use of the novel safety switching device for applications up to and including category 4/SIL3, because two configurable device connectors might be used as redundant inputs and/or redundant outputs.

In a further refinement, at least one of the output circuits comprises the at least one switching element.

In this refinement, at least one of the configurable device connectors serves as output connector via which the safety switching device shuts down the electrical load. As an alternative, it is conceivable in other refinement that the switching elements for shutting down the load are arranged at non-configurable device connectors, i.e. that the configurable device connectors are essentially used for actuating signaling devices and for receiving the input signals from such signaling devices. The present refinement, in contrast, allows for an even higher flexibility. In some exemplary embodiments, all device connectors for connecting signaling devices and/or actuators are implemented as configurable device connectors with a combined input circuit and output circuit of the type described above.

In a further refinement, the evaluation and control unit is designed for repeatedly suppressing the input signal within defined time intervals by means of the test switch. The evaluation and control unit preferably suppresses the input signal using the test switch at periodic time intervals.

In this refinement, the evaluation and control unit automatically tests the functionality of the input circuit within the defined time intervals. In some exemplary embodiments, the length of the defined time intervals is predefined in the evaluation and control unit. In other exemplary embodiments, the length of the defined time intervals can be configured by the user of the safety switching device. The refinement advantageously contributes to reducing the probability of occurrence of a second fault after the occurrence of a first fault. This refinement thus makes it easier to achieve a high safety category.

In a further refinement, the evaluation and control unit is designed for selectively generating, by means of the output circuit, a steady-state output signal or a clocked output signal having a defined clock period.

This refinement is advantageous if the output circuit is to be used for providing a loop-back signal by means of which passive signaling devices such as, for instance, an emergency-off push button, are monitored. The refinement allows either steady-state or clocked output signals to be fed to the signaling device so that the user can use the novel safety switching device even more flexibly.

In a further refinement, the evaluation and control unit has a first and a second signal processing channel which process the input signal redundantly with respect to one another in order to actuate the at least one switching element. In some exemplary embodiments, the first and the second signal processing channel alternately actuate the test switch. In other exemplary embodiments, the safety switching device can have two redundant test switches, for example in series with one another, with each one signal processing channel actuating one of the redundant test switches. In other exemplary embodiments, however, the input circuit has only one test switch which is actuated by the first signal processing channel, with the two signal processing channels comparing their test results similarly to the redundant processing of the input signal.

The refinement allows for continuous one-fault tolerance in the signal processing part of the safety switching device and thus for a high operating variability and flexibility.

In a further refinement, the safety switching device has at least two switching elements which are actuated redundantly by the evaluation and control unit in order to interrupt the current supply path to the load.

This refinement, too, contributes to simplifying for the user the implementation of a safety circuit which meets the requirements of category 4/SIL3.

It goes without saying that the aforementioned features and those still to be explained in the text which follows can be used not only in the combination specified in each case but also in other combinations or by themselves without departing from the context of the present invention.

BRIEF DESCRIPTION OF THE DRAWINGS

Exemplary embodiments of the invention are illustrated in the drawing and will be explained in greater detail below, in which drawing.

DESCRIPTION OF PREFERRED EMBODIMENTS

Figure 1:
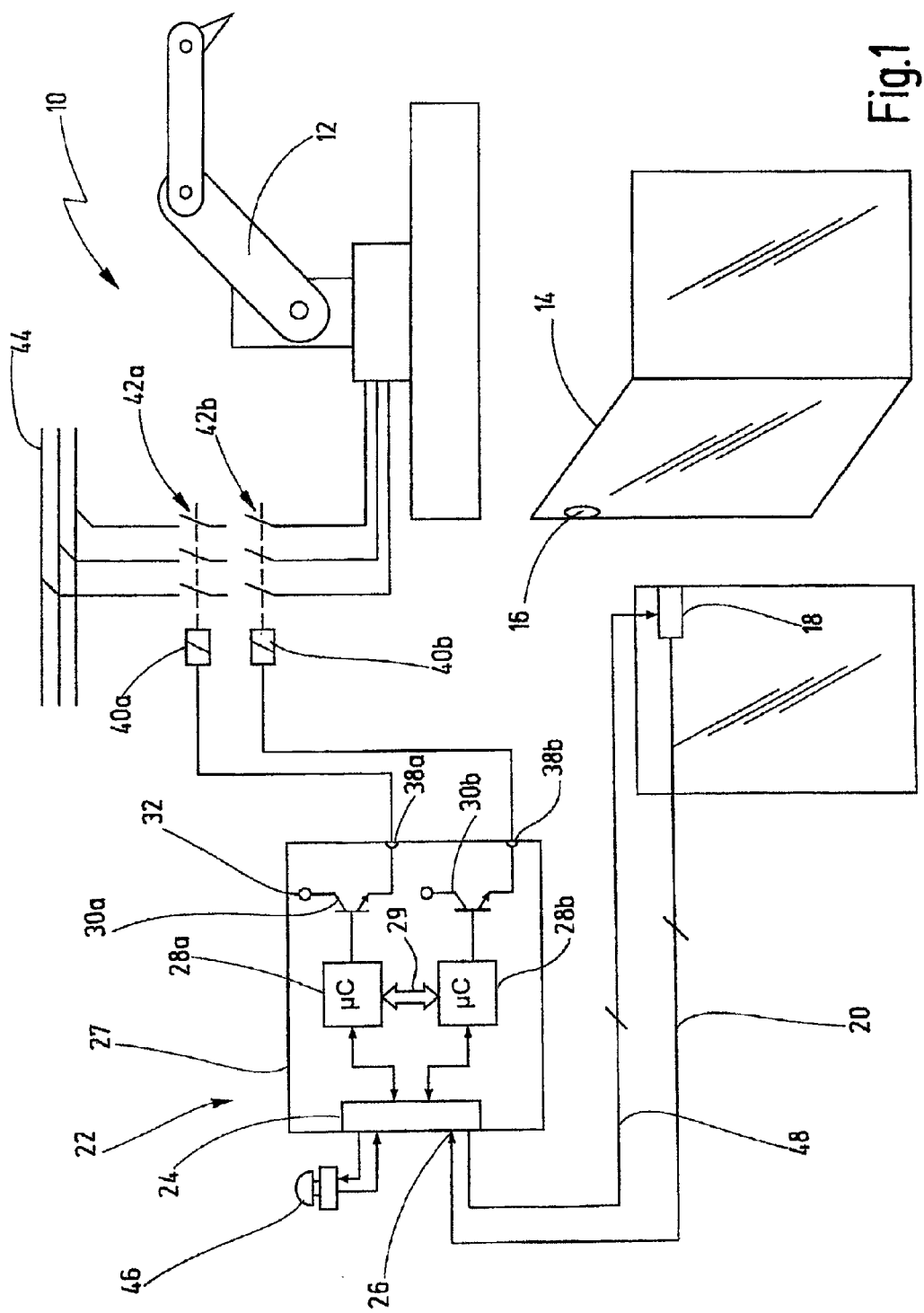
FIG. 1 shows a simplified representation of a preferred exemplary embodiment of the novel safety switching device on a machine installation.

In FIG. 1, an installation comprising an exemplary embodiment of the novel safety switching device is designated by reference number 10 in its entirety. By way of example, the installation 10 comprises a robot 12, the movement of which during operation presents a hazard to persons who are located within the operating range of the robot 12. For this reason, the operating range of the robot 12 is safeguarded by means of a protective fence with a guard door 14. The guard door 14 allows access into the safeguarded operating range of the robot 12, for example for maintenance work or for setting-up work. During normal operation, however, the robot 12 may only operate when the guard door 14 is closed. As soon as the guard door 14 is opened, the robot 12 must be shut down or brought into a safe state in another suitable manner.

In order to detect the closed state of the guard door 14, a guard-door switch having a door part 16 and a frame part 18 is mounted on the guard door 14. The frame part 18 generates on a line 20 a guard-door signal which is supplied via line 20 to an exemplary embodiment 22 of the novel safety switching device.

In the present exemplary embodiment, the safety switching device 22 has an I/O part 24 with a plurality of device connectors 26. In some exemplary embodiments, the device connectors 26 are connecting terminals which are arranged on a side of device housing 27 of the safety switching device 22. By way of example, they can be spring-type terminals or screw-type terminals. In other exemplary embodiments, the device connectors can be plugs or sockets which comprise a number of contact elements (pins), with one pin in each case forming a device connector. By way of example, M8 sockets having five contact pins for the connection of signaling devices or other sensors are often used at field level. Correspondingly, exemplary embodiments of the novel safety switching device can be field devices which are arranged outside a switchgear cabinet and spatially close to the robot 12.

In the present exemplary embodiment, the safety switching device 22 has two redundant signal processing channels. By way of example, two microcontrollers 28a, 28b are shown here which are in each case connected to the I/O part 24. The microcontrollers 28a, 28b in this case process redundantly with respect to one another the input signals which are received by the safety switching device 22 at the device connectors 26 of the I/O part, and they compare their results which is shown by means of an arrow 29. Instead of two microcontrollers 28a, 28b, microprocessors, ASICs, FPGAs and/or other signal processing circuits can be used. Exemplary embodiments of the safety switching device 22 preferably have at least two mutually redundant signal processing channels which are in each case capable of producing logical signal processing in order to actuate switching elements for shutting down the robot 12 in dependence thereon.

In the case shown here, the safety switching device 22 has two redundant switching elements 30a, 30b. Each of these two switching elements is capable of switching a high voltage potential 32 through to a device connector 38a, 38b of the safety switching device 22 in order to provide for a current flow to a contactor 40a, 40b or to interrupt this current flow. Each of the switching elements 30 can thus shut down an actuator such as a contactor or a magnetic valve.

The contactors 40a, 40b each have normally-open contacts 42a, 42b here. The normally-open contacts 42a, 42b are arranged here in series with one another in a current supply path from a power supply 44 to the robot 12. As soon as the safety switching device 22 interrupts current to the contactors 40a, 40b, the contacts 42 drop out and the power supply for the robot 12 is shut down. The skilled persons will recognize that such "radical" shutting down is described here by way of example. As an alternative, only parts of the robot 12 can be shut down for safety reasons such as, for instance, the hazardous drives, whilst other parts of the robot 12 remain operable. A delayed shutting down is also conceivable so that the robot 12 may be slowed down in a controlled manner before shutting down the drives.

The safety switching device 12 in this case actuates the switching elements 30a, 30b in dependence on the signal of the guard-door switch on the line 20 and in dependence on a further input signal from an emergency-off push button 46. The emergency-off push button 46 is also connected via lines to device connectors 26 of the safety switching device 22.

In some exemplary embodiments, the safety switching device 22 generates output signals which are supplied to the individual signaling devices. For example, such an output signal is conducted via a line 48 to the frame part 18 of the guard-door switch. The frame part 18 loops the output signal of the safety switching device 22 from line 48 to line 20 when the door part 16 is in the vicinity of the frame part 18, i.e. when the guard door 14 is closed. The safety switching device 22 can therefore monitor the guard-door switch by means of the output signal on line 48 and by means of the input signal on line 20. In a similar manner, the safety switching device 22 monitors here the emergency-off push button 46.

In deviation from the representation in FIG. 1, two redundant output signals of the safety switching device 22 are often used in practice, which redundant output signals are supplied to a signaling device via separate signal lines and are looped back to the safety switching device 22 via the signaling device. As an example of such an implementation, reference is made to DE 10 2004 020 995 A1 which is included here by reference with regard to the details of such a redundant monitoring of a signaling device. The emergency-off push button 46, too, is often monitored with redundant input and output lines in practice.

Figure 2:
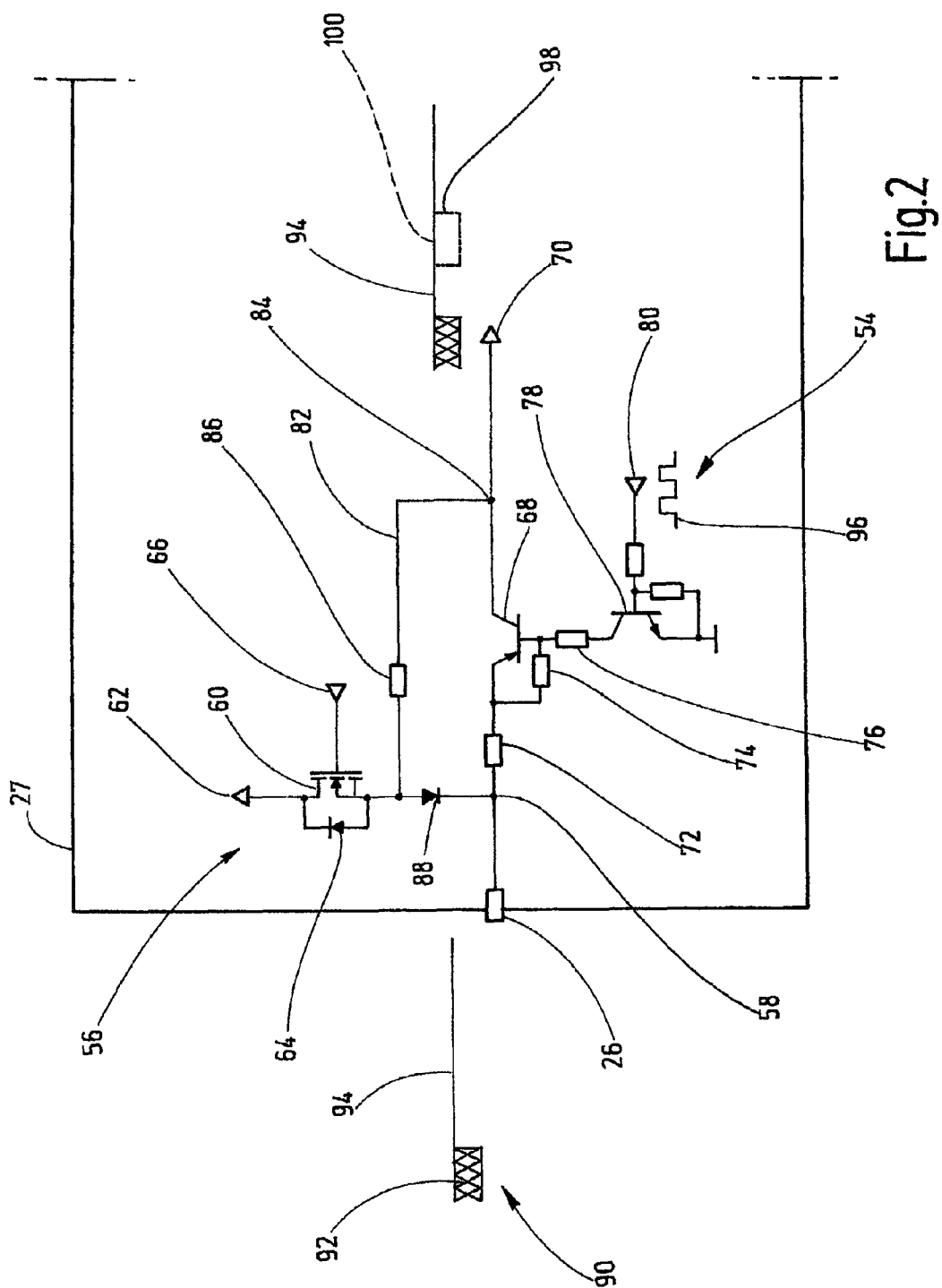
FIG. 2 shows one of the configurable device connectors of the safety switching device from FIG. 1.

FIG. 2 shows a preferred exemplary embodiment for implementing a configurable device connector of the safety switching device 22. In the preferred exemplary embodiments, all signal inputs for connecting signaling devices are implemented in the form of such a device connector or in the form of a similar configurable device connector. Furthermore, the outputs of the I/O part 24, too, are implemented in the form of such a device connector or similar device connector in the preferred exemplary embodiments so that the safety switching device 22 in the preferred exemplary embodiments only has configurable device connectors 26 which can be selectively used as input or as output.

Furthermore, the device connectors 38a, 38b of the safety switching device 22 can also be implemented as configurable device connectors of the type represented in FIG. 2. In these cases, the safety switching device 22 can have only configurable device connectors for connecting signaling devices and/or actuators. In such exemplary embodiments, the safety switching device 22 will then need only additional connections for supplying an operating voltage ($U_B$ and ground) and possibly device connectors for a data communication such as, for example, a connection for field bus systems such as SafetyNET P®.

In the preferred exemplary embodiments, the safety switching device 22 has for each device connector 26 an input circuit 54 and an output circuit 56. The input circuit 54 is used for receiving an input signal which is supplied to the device connector 26, for example for receiving the signal 20 from the guard-door switch 18. Output circuit 56 is used to generate an output signal such as, for instance, the output signal which is conveyed to the guard-door switch 18 via line 48. Obviously, the configurable device connector 26 is configured either as input or as output in these cases, i.e. it does not fulfill both functions at the same time.

Input circuit 54 and output circuit 56 are joined at a node 58. In this exemplary embodiment, node 58 is connected electrically directly to connector 26. In other exemplary embodiments, some components, such as a filter circuit or the like, can be arranged between the terminal or the contact element at device connector 26 and the node 58, however.

In the present exemplary embodiment, the output circuit has an MOS transistor 60, the source terminal of which is connected to a defined voltage potential 62. The voltage potential 62 can be, for example, a 24-volt potential which is derived from the operating voltage supplied to the safety switching device 22 for supply (not shown here). In parallel with the source-drain path of the MOS transistor 60, a suppressor diode 64 is arranged here in order to limit voltage peaks during shutting-down of inductive loads. The gate terminal of the MOS transistor 60 is connected to a connecting point 66 which, in the preferred exemplary embodiments, is fed to the evaluation and control unit 28 of the safety switching device 22 so that the evaluation and control unit 28 can switch the MOS transistor 60 to selectively conduct or to block. In some exemplary embodiments, the I/O part 24 may comprise a logical AND gate (not shown here), the output of this AND gate being connected to the connecting point 66 and the at least two inputs of the AND gate being actuated by in each case one of the signal processing channels 28a, 28b of the evaluation and control unit.

The input circuit 54 has a test switch which is arranged here as a series transistor 68 between the node 58 and a further connecting point 70. In the exemplary embodiment shown, the transistor 68 is a PNP transistor. The collector of the PNP transistor 68 is connected to the connecting point 70 whilst the emitter of the PNP transistor 68 is connected to the node 58 via a resistor 72. The base of the PNP transistor 68 is connected to a tap of a voltage divider, a first resistor 74 of the voltage divider being connected in parallel with the base-emitter path whilst a second resistor 76 of the voltage divider leads to the emitter of a further transistor 78. The emitter of the further transistor 78 is connected to a ground potential. The base terminal of the further transistor 78 is connected to a further connecting point 80. The further connecting point 80 is also coupled to the evaluation and control unit (not shown here). In some exemplary embodiments, the connecting point 80 is only connected to one of the signal processing channels 28a, 28b. In each case, the evaluation and control unit can switch the series transistor 68 to conduct or to block via a control signal at the connecting point 80 in order to thus switch an input signal at the device connector 26 selectively through to connecting point 70 or to disconnect it from the connecting point 70. In the latter case, the evaluation and control unit suppresses the input signal at the device connector 26 using the series transistor 68 since it can no longer reach the evaluation and control unit via the connecting point 70.

Reference number 82 designates a signal path which leads from the drain terminal of the MOS transistor 60 to a node 84. The node 84 is connected to the collector of the series transistor 68. Signal path 82 thus forms a bridging path which leads via node 58 and node 84. A resistor 86 is also arranged here in signal path 82. Furthermore, a diode 88 is connected in reverse direction between node 58 and the drain terminal of the MOS transistor 60 so that an input signal from device connector 26 cannot reach the node 84 via the signal path 82. However, an output signal at the drain terminal of the MOS transistor 60 is conducted via resistor 86 and node 84 to the connecting point 70.

The configurable device connector 26 shown here operates as follows:

When the device connector 26 is to be used as an output for outputting an output signal, the signal processing channels 28a, 28b of the evaluation and control unit selectively control the MOS transistor 60 to conduct or to block via the connecting point 66. In this manner, the evaluation and control unit can generate at the device connector 26 an output signal which changes between a high level (voltage potential 62) and a low level (0 volt, high-impedance). Via signal path 82 and connecting point 70, the signal processing channels 28a, 28b can read back the generated output signal at the device connector 26. This is advantageous especially if the MOS transistor 60 is used as one of the switching elements 30a, 30b in order to switch one of the contactors 40a, 40b to conduct or to block. In some cases, the evaluation and control unit actuates the transistor 78 via the connecting point 80 in such a manner that the series transistor 68 is opened whilst the MOS transistor 60 generates the output signal at the device connector 26 in order to decouple the input circuit from the output circuit.

If, in contrast, the device connector 26 is to be used as input, the evaluation and control unit opens the MOS transistor 60 via the connecting point 66. If the MOS transistor 60 operates faultlessly, the signal path 82 becomes a high-impedance pass. An input signal can now pass via the device connector 26 and the series transistor 68 to the connecting point 70 and from there to the two signal processing channels 28a, 28b of the control unit. As an example, an input signal is shown at reference number 90 in FIG. 2. The input signal 90 can have an arbitrary signal state in a first period 92 which passes via the conductively switched series transistor 68 to the connecting point 79. If the signal has a high signal level in period 94, it passes via the conductively switched series transistor 68 to the connecting point 70. In the preferred exemplary embodiments, the evaluation and control unit suppresses the input signal 90, however, by means of the series transistor 68 in periodic time intervals by generating a periodic control signal 96 (for example a rectangular signal) at connecting point 80. With each positive signal pulse of the control signal 96, the control transistor 78 opens the series transistor 68. Correspondingly, the high level 94 of signal 90 does not reach connecting point 70 during a defined time interval 98. Since the evaluation and control unit itself has initiated this test, it can check the functionality of the input at device connector 26 and especially the capability of detecting low levels by means of the suppressed input signal 98.

Should the MOS transistor 60 break down due to a component failure, the voltage potential 62 would pass to node 64 via the signal path 82 and, in consequence, the evaluation and control unit would also "see" a high potential even when the series transistor 68 is blocked. This is shown symbolically at reference number 100. In such a case, the evaluation and control unit could no longer detect a low level at the device connector 26. The evaluation and control unit therefore generates in such a case a shutdown signal at device connectors 38 in order to bring the installation into a safe state of rest.

The novel safety switching device 22 thus has configurable device connectors 26 which can be selectively used as input or output of a safety switching device. Both the input function and the output function can be used for implementing safety functions since the safety switching device 22, due to the test switch 68 and the bridging signal path 82, ensures that safety-related low levels are detected at the input. To implement a safe output, the safety switching device 22, in preferred exemplary embodiments, provides a number of configurable device connectors so that in each case two output circuits 56 can be used as redundant switching elements for redundantly shutting down an electrical load.

What is claimed is:

1. In an installation comprising a hazardous machine and at least one signaling device for signaling a safety-related state of said machine, a safety switching device configured for failsafely shutting down the machine, the safety switching device comprising:
   a number of connecting terminals,
   at least one input circuit for receiving an input signal from the signaling device,
   at least one output circuit for outputting an output signal,
   at least one switching element designed for interrupting a current supply path to the machine, and
   an evaluation and control unit connected to said at least one input circuit for receiving said input signal and connected to said at least one output circuit for transmitting said output signal to said at least one output circuit, said evaluation and control unit being designed for actuating the at least one switching element in dependence on the input signal,
   with the at least one input circuit and the at least one output circuit being connected to the same one of said number of connecting terminals so that said one connecting terminal can selectively be used either as an input terminal for receiving the input signal or as an output terminal for outputting the output signal,
   with the input circuit comprising a test switch coupled to the evaluation and control unit, and
   with the evaluation and control unit being designed for selectively suppressing the input signal using the test switch.

2. The safety switching device of claim 1, wherein the at least one input circuit and the at least one output circuit are joined at a node which is located between said one connecting terminal and the test switch.

3. The safety switching device of claim 1, further comprising a signal path which is connected to the output circuit and which by-passes the test switch.

4. The safety switching device of claim 3, further comprising a directional coupler which is arranged between the signal path and the device connector in order to decouple the signal path from the connecting terminal.

5. The safety switching device of claim 4, wherein the directional coupler is a diode.

6. The safety switching device of claim 1, comprising a plurality of input circuits and a plurality of output circuits which are respectively joined in pairs at a plurality of connecting terminals.

7. The safety switching device of claim 1, wherein the output circuit comprises the at least one switching element.

8. The safety switching device of claim 1, wherein the evaluation and control unit is designed for repeatedly suppressing the input signal using the test switch.

9. The safety switching device of claim 1, wherein the evaluation and control unit is designed for selectively generating, by means of the output circuit, a steady-state output signal or a clocked output signal having a defined clock period.

10. The safety switching device of claim 1, wherein the evaluation and control unit has a first and a second signal processing channel which process the input signal redundantly with respect to one another in order to actuate the at least one switching element.

11. The safety switching device of claim 1, comprising at least two switching elements which are actuated redundantly by the evaluation and control unit in order to interrupt the current supply path to the machine.

12. A safety switching device for the failsafe shutdown of an electrical load, comprising:
   a number of device connectors,
   at least one input circuit for receiving an input signal from a signaling device signaling a safety-related state,
   at least one output circuit for outputting an output signal,
   at least one switching element for interrupting a current supply path to the load, and
   an evaluation and control unit connected to said at least one input circuit for receiving said input signal and connected to said at least one output circuit for transmitting said output signal to said at least one output circuit, said evaluation and control unit being designed for actuating the at least one switching element in dependence on the input signal,
   with the at least one input circuit and the at least one output circuit being connected to the same one of said number of device connectors so that said one device connector can selectively be used as an input for receiving the input signal or as an output for outputting the output signal,
   with the input circuit having a test switch coupled to the evaluation and control unit, and
   with the evaluation and control unit being designed for selectively suppressing the input signal using the test switch.

13. The safety switching device of claim 12, wherein the at least one input circuit and the at least one output circuit are joined at a node which is located between said one device connector and the test switch.

14. The safety switching device of claim 12, further comprising a signal path which is connected to the output circuit and which by-passes the test switch.

15. The safety switching device of claim 14, further comprising a diode arranged between the signal path and the device connector in order to decouple the signal path from the device connector.

16. The safety switching device of claim 12, wherein the output circuit comprises the at least one switching element.

17. The safety switching device of claim 12, wherein the evaluation and control unit is designed for repeatedly suppressing the input signal using the test switch.

18. The safety switching device of claim 12, wherein the evaluation and control unit is designed for selectively generating, by means of the output circuit, a steady-state output signal or a clocked output signal having a defined clock period.

19. The safety switching device of claim 12, wherein the evaluation and control unit has a first signal processing channel and a second signal processing channel which process the input signal redundantly with respect to one another in order to actuate the at least one switching element.

20. The safety switching device of claim 12, comprising at least two switching elements which are redundantly actuated by the evaluation and control unit in order to interrupt the current supply path to the load in a failsafe manner.

* * * * *